United States Patent
Jang et al.

(10) Patent No.: US 8,289,490 B2
(45) Date of Patent: Oct. 16, 2012

(54) LIQUID CRYSTAL DISPLAY DEVICE AND METHOD OF DRIVING THE SAME

(75) Inventors: Hyung-Seok Jang, Gyeonggi-do (KR); Joon-Kyu Park, Gyeonggi-do (KR); Hyun-Suk Jin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/707,058

(22) Filed: Feb. 17, 2010

(65) Prior Publication Data

US 2010/0141569 A1    Jun. 10, 2010

Related U.S. Application Data

(62) Division of application No. 11/639,228, filed on Dec. 15, 2006, now Pat. No. 7,692,750.

(30) Foreign Application Priority Data

Dec. 29, 2005    (KR) .................. 10-2005-0133550

(51) Int. Cl.
    *G02F 1/1343*    (2006.01)
    *G02F 1/133*    (2006.01)
(52) U.S. Cl. .......... 349/143; 349/33; 349/139; 349/141; 345/95
(58) Field of Classification Search .............. 349/33–38, 349/139–143; 345/87, 95
    See application file for complete search history.

(56) References Cited

U.S. PATENT DOCUMENTS

| | | | |
|---|---|---|---|
| 5,434,690 | A | 7/1995 | Hisatake et al. |
| 6,556,181 | B2 | 4/2003 | Yamada et al. |
| 6,876,419 | B2 | 4/2005 | Kim et al. |
| 6,977,711 | B2 | 12/2005 | Kwak et al. |

(Continued)

FOREIGN PATENT DOCUMENTS

CN    1598652 A    3/2005

(Continued)

OTHER PUBLICATIONS

Office Action issued in corresponding Japanese Application No. 2006-334003 on Jan. 6, 2010.

*Primary Examiner* — Dung T. Nguyen
(74) *Attorney, Agent, or Firm* — Morgan, Lewis & Bockius LLP

(57) ABSTRACT

A liquid crystal display device includes first and second substrates facing each other, a layer of liquid crystal molecules interposed between the first and second substrates, a plurality of color displaying sub-pixels including first, second and third sub-pixels defined on the first and second substrates, first common electrodes in the first, second and third sub-pixels on the first substrate, first pixel electrodes in the first, second and third sub-pixels on the first substrate and alternately arranged with the first common electrodes, color filter layers in the first, second and third sub-pixels on the second substrate, a plurality of viewing angle restricting sub-pixels including fourth, fifth and sixth sub-pixels defined on the first and second substrates, the fourth, fifth and sixth sub-pixels corresponding one-to-one with the first, second and third sub-pixels, second pixel electrodes in the fourth, fifth and sixth sub-pixels on the first substrate, and second common electrodes in the fourth, fifth and sixth sub-pixels on the second substrate.

10 Claims, 15 Drawing Sheets

U.S. PATENT DOCUMENTS

| | | |
|---|---|---|
| 7,502,084 B2 | 3/2009 | Nishimura |
| 2007/0153197 A1* | 7/2007 | Park et al. .................... 349/141 |

FOREIGN PATENT DOCUMENTS

| | | |
|---|---|---|
| CN | 1621928 A | 6/2005 |
| CN | 1645195 A | 7/2005 |
| CN | 1700077 A | 11/2005 |
| CN | 1704822 A | 12/2005 |
| JP | 1-244425 A | 9/1989 |
| JP | 9-325346 A | 12/1997 |
| JP | 2004-354407 A | 12/2004 |

* cited by examiner though embodiments of the invention are suitable for a wide scope of applications, they are particularly suitable for restricting viewing angle.
LIQUID CRYSTAL DISPLAY DEVICE AND METHOD OF DRIVING THE SAME This application is a Divisional of application Ser. No. 11/639,228, filed Dec. 15, 2006. This invention claims the benefit of Korean Patent Application No. 10-2005-0133550 filed in Korea on Dec. 29, 2005, which is hereby incorporated by reference in its entirety.

BACKGROUND OF THE INVENTION

1. Field of the Invention

Embodiments of the invention relates to a display device, and more particularly, to a liquid crystal display device and a method of driving the same. Although embodiments of the invention are suitable for a wide scope of applications, they are particularly suitable for restricting viewing angle.

2. Discussion of the Related Art

Generally, a liquid crystal display (LCD) includes a first substrate, a second substrate, and a layer of liquid crystal molecules. The first and second substrates face each other and are spaced apart from each other. The layer of liquid crystal molecules is interposed therebetween. The LCD device uses optical anisotropy and polarization properties of liquid crystal molecules to display images.

The liquid crystal molecules have orientation characteristics resulting from their thin long shape. Thus, an arrangement direction of the liquid crystal molecules can be controlled by applying an electrical field across the liquid crystal molecules. A thin film transistor (TFT) can be used as a switching element to control application of the electric field. An LCD device using a TFT is referred to as an active matrix LCD (AM-LCD) device, which has excellent characteristics of high resolution and being able to smoothly display moving images.

A related art LCD device includes a first substrate, a second substrate and a layer of liquid crystal molecules. The first substrate includes a pixel electrode, and the second substrate includes a color filter layer and a common electrode. The first and second substrates face each other, and the layer of liquid crystal molecules is interposed therebetween. The related art LCD device displays images using a vertical electric field between the pixel and common electrodes. The LCD device using the vertical electric field has a high transmittance and a high aperture ratio.

The LCD device using the vertical electric field has the problems of narrow viewing angle and low contrast ratio. To resolve the above-mentioned problems, new display devices, such as an in-plane switching (IPS) mode LCD device, a vertical alignment (VA) mode LCD device and a fringe field switching mode LCD device can be used instead of a vertical electric field LCD. These LCD devices are explained in reference to FIGS. 1 to 3.

FIG. 1 is a cross-sectional view of an IPS mode LCD device according to the related art. As shown in FIG. 1, the IPS mode LCD device includes first and second substrates 10 and 20 and a layer of liquid crystal molecules 30 interposed therebetween. The first substrate 10 includes pixel and common electrodes 12 and 14 such that a horizontal electric field 40 is induced between the pixel and common electrodes 12 and 14 using voltages applied to the pixel and common electrodes 12 and 14. The IPS mode LCD device uses the horizontal electric field 40 to display images. Since there is little variance in the refractive index of the liquid crystal molecules in the light transmission path while switching the IPS mode LCD device, a wide viewing angle is maintained.

FIG. 2A is a cross-sectional view of a VA mode LCD device according to the related art. As shown in FIG. 2A, the VA mode LCD device includes first and second substrates 10 and 20 and a layer of liquid crystal molecules 30 interposed therebetween. The pixel and common electrodes 12 and 24 are formed on the first and second substrates 10 and 20, respectively. A pixel electrode slit 12a and a common electrode slit 14a are formed on the pixel and common electrodes 12 and 24, respectively. An electric field 50 induced between the pixel and common electrodes 12 and 24 is distorted by the pixel electrode slit 12a and the common electrode slit 14a such that first and second oblique electric fields 50a and 50b are formed. As a result, the VA mode LCD device has two domains that result in a wide viewing angle.

FIG. 3 is a cross-sectional view of an FES mode LCD device according to the related art. As shown in FIG. 3, the FES mode LCD device includes first and second substrates 10 and 20 and a layer of liquid crystal molecules 30 interposed therebetween. The common electrode 14, a gate insulating layer 16 and a plurality of pixel electrodes 12 having a bar shape are sequentially formed on the first substrate 10. The common electrode 14 is formed over the entire surface of the first substrate 10. The plurality of pixel electrodes 12 are separated from each other. The gate insulating layer 16 between the common electrode 14 and the pixel electrodes 12 prevents a short between the common and pixel electrodes 14 and 12. Since the pixel and common electrodes 12 and 14 are formed on the first substrate and of different layers, a fringe field 60 is formed between the pixel and common electrodes 12 and 14. The fringe field 60 has a reverse U-shape. Since the reverse U-shape has a flat top portion, the FES mode LCD device functions like the VA mode LCD device so as to have a wide viewing angle.

The above-mentioned LCD devices having a wide viewing angle that also resolves the problems of color shift and gray inversion at side viewing angles. A wide viewing angle is useful in that many users at different viewing angles can observe the same image. However, there are situations in which only one viewer should see the image. For example, a person using an automatic teller machine should be the only person able to view the image. In this case, the viewing angle should restricted. A method of restricting the viewing angle with a filter has been used in the past. However, the filter method increases production time and production costs of the LCD device as well as dims the brightness of the display.

SUMMARY OF THE INVENTION

Accordingly, embodiments of the invention are directed to a liquid crystal display device that substantially obviates one or more of the problems due to limitations and disadvantages of the related art.

An object of the present invention is to provide a liquid crystal display device that selectively restricts viewing angle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes first and second substrates facing each other, a layer of liquid crystal molecules interposed between the first and second substrates, a plurality of color displaying sub-pixels including first, second and third sub-pixels defined on the first and second substrates, first common electrodes in the first, second and third sub-pixels on the first substrate, first pixel electrodes in the first, second and third sub-pixels on the first substrate and alternately arranged with the first common electrodes, color filter layers in the first, second and third sub-pixels on the second substrate, a plurality of viewing angle restricting sub-pixels including fourth, fifth and sixth sub-pixels defined on the first and second substrates, the fourth, fifth and sixth sub-pixels corresponding one-to-one with the first, second and third sub-pixels, second pixel electrodes in the fourth, fifth and sixth sub-pixels on the first substrate, and second common electrodes in the fourth, fifth and sixth sub-pixels on the second substrate.

In another aspect of embodiments of the invention, a liquid crystal display device includes first and second substrate facing each other, a layer of liquid crystal molecules interposed between the first and second substrates, a plurality of color displaying sub-pixels including first, second and third sub-pixels and defined on the first and second substrates, first pixel electrodes in the first, second and third sub-pixels on the first substrate, color filter layers in the first, second and third sub-pixels on the second substrate, first common electrodes on the color filter layers, first and second slits on the first pixel electrodes and the first common electrodes, respectively, a plurality of viewing angle restricting sub-pixels including fourth, fifth and sixth sub-pixels and defined on the first and second substrates, the fourth, fifth and sixth sub-pixels corresponding one-to-one with the first, second and third sub-pixels, second pixel electrodes in the first, second and third viewing angle restricting sub-pixels on the first substrate, second common electrodes in the fourth, fifth and sixth sub-pixels on the second substrate, and third and fourth slits in the second pixel electrodes and the second common electrodes, respectively, wherein the first and second slits are alternately arranged with and parallel to each other, and wherein the third and fourth slits are alternately arranged with and parallel to each other.

In another aspect of embodiments of the invention, a method of driving a liquid crystal display device including first, second and third color displaying sub-pixels and first, second and third viewing angle restricting sub-pixels, wherein the first, second and third color displaying sub-pixels correspond to one-to-one with the first, second and third viewing angle restricting sub-pixels, and wherein the first, second and third color displaying sub-pixels includes first and second electrodes, and the first, second and third viewing angle restricting sub-pixels includes third and fourth electrodes, includes applying first and second voltages to the first and second electrodes in each of the first, second and third color displaying sub-pixels and third and fourth voltages to the third and fourth electrodes in each of the first, second and third viewing angle restricting sub-pixels, wherein the third and fourth voltages are same as each other; and applying fifth and sixth voltages to the first and second electrodes in each of the first, second and third color displaying sub-pixels and seventh and eighth voltages to the third and fourth electrodes in each of the first, second and third viewing angle restricting sub-pixels, wherein the third and fourth voltages are different from each other.

In another aspect of embodiments of the invention, a method of driving a liquid crystal display device including first, second and third color displaying sub-pixels and first, second and third viewing angle restricting sub-pixels, wherein the first, second and third color displaying sub-pixels correspond to one-to-one with the first, second and third viewing angle restricting sub-pixels, and wherein the first, second and third color displaying sub-pixels includes first and second electrodes, and the first, second and third viewing angle restricting sub-pixels includes third, fourth and fifth electrodes, includes applying first and second voltages to the first and second electrodes in each of the first, second and third color displaying sub-pixels and third and fourth voltages to the third and fourth electrodes in each of the first, second and third viewing angle restricting sub-pixels, wherein the third and fourth voltages correspond to the first and second voltages, respectively; and applying fifth and sixth voltages to the first and second electrodes in each of the first, second and third color displaying sub-pixels and seventh and eighth voltages to the third and fifth electrodes in each of the first, second and third viewing angle restricting sub-pixels, wherein the third and fourth voltages are different from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments, examples of which are illustrated in the accompanying drawings.

Figure 1:
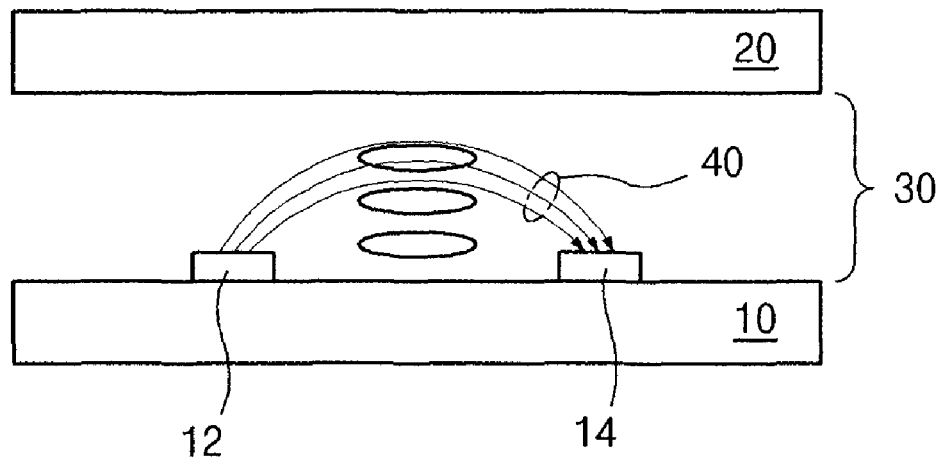
FIG. 1 is a cross-sectional view of an IPS mode LCD device according to the related art.
Figure 2A:
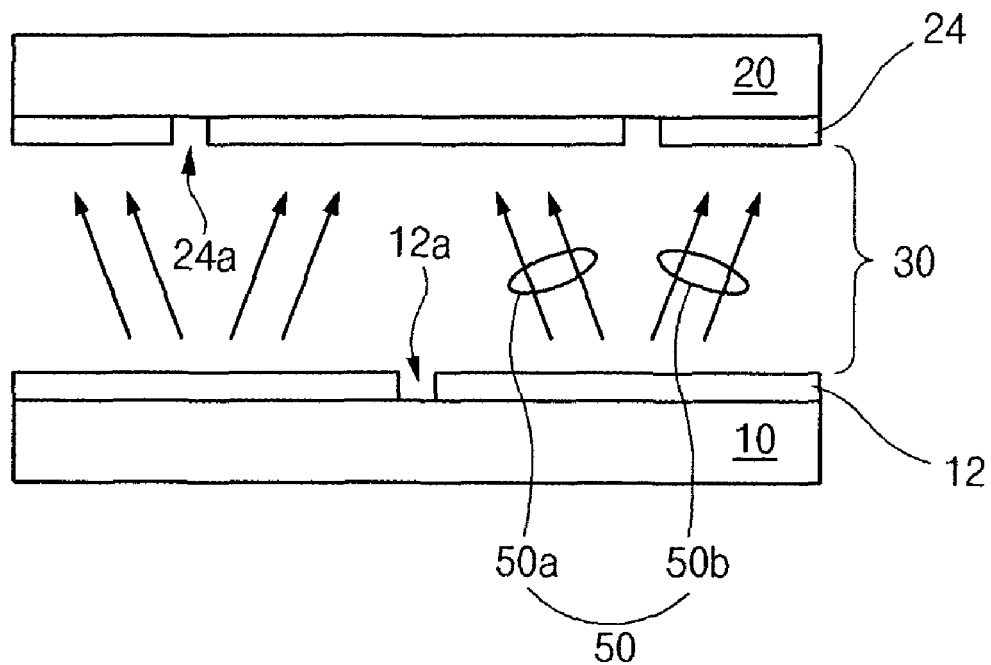
FIG. 2A is a cross-sectional view of a VA mode LCD device according to the related art.
Figure 3:
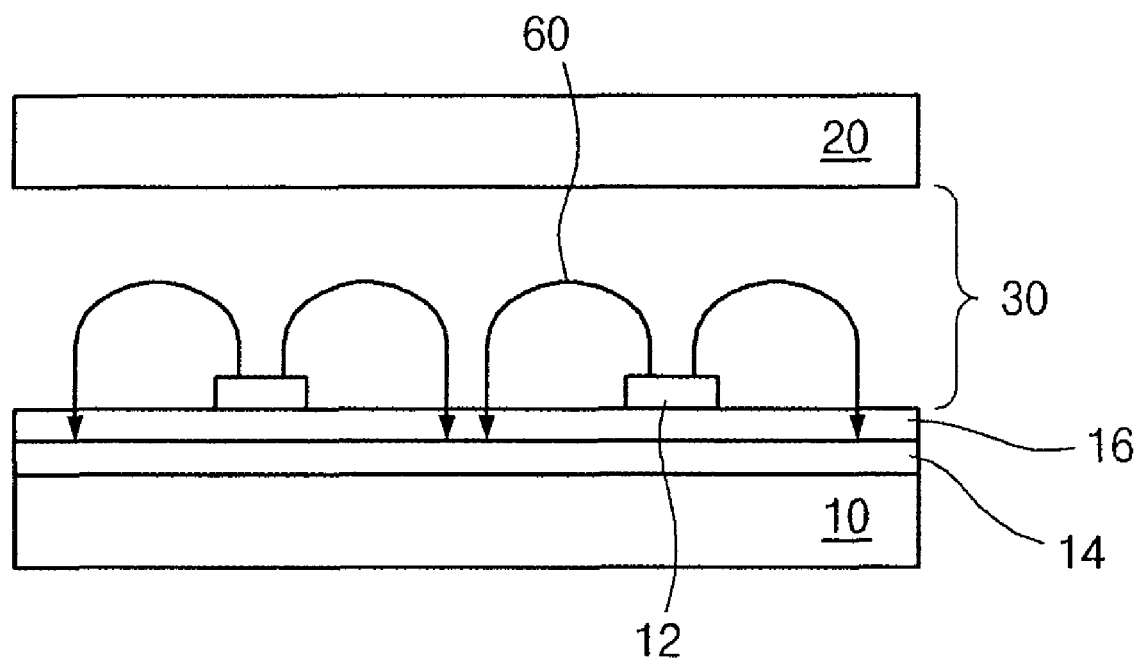
FIG. 3 is a cross-sectional view of an FES mode LCD device according to the related art.
Figure 4A:
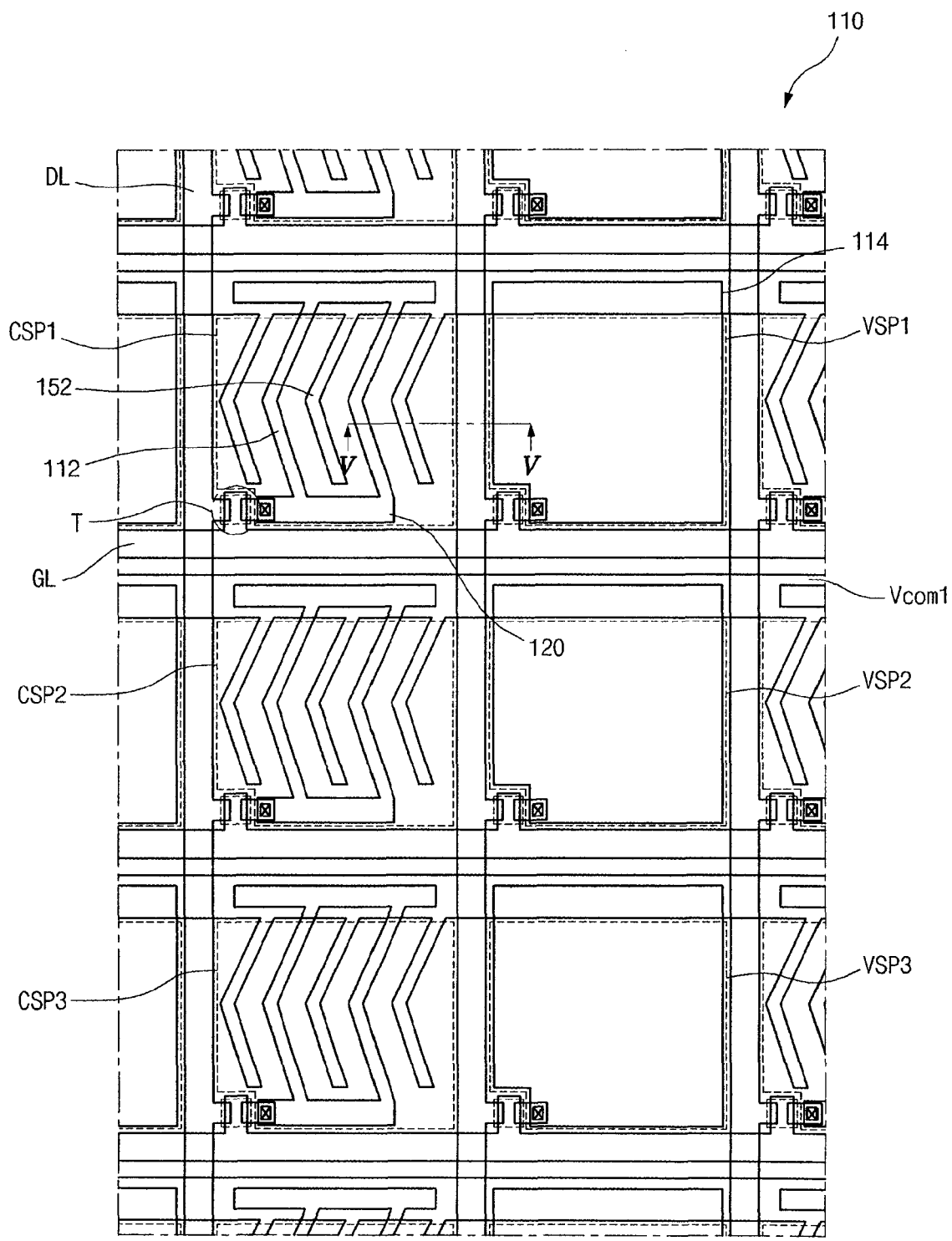
FIGS. 4A and 4B are plane views showing an array substrate and a color filter substrate for a viewing angle restricting LCD device according to a first exemplary embodiment of the invention, respectively.
Figure 4B:
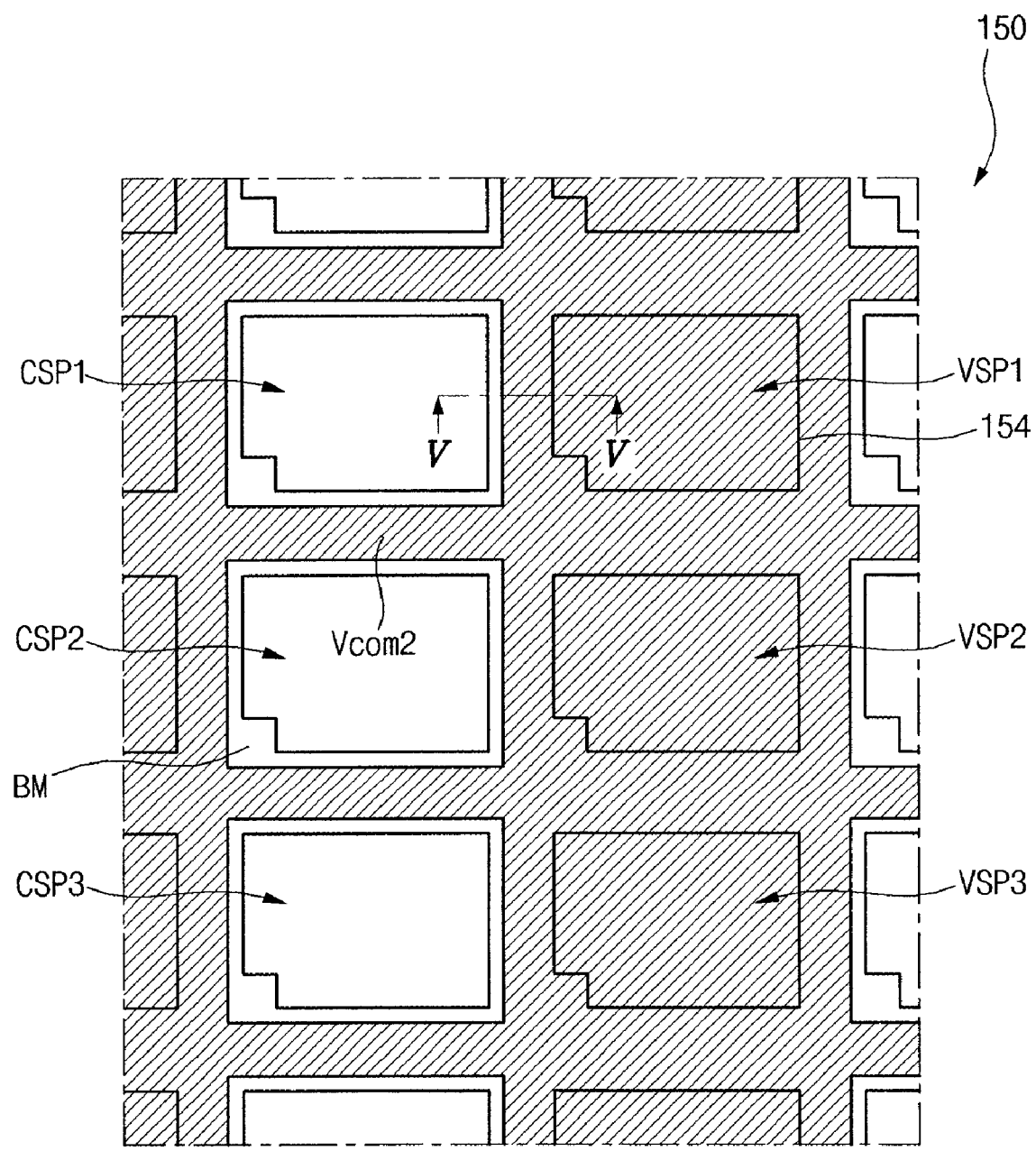
Figure 5:
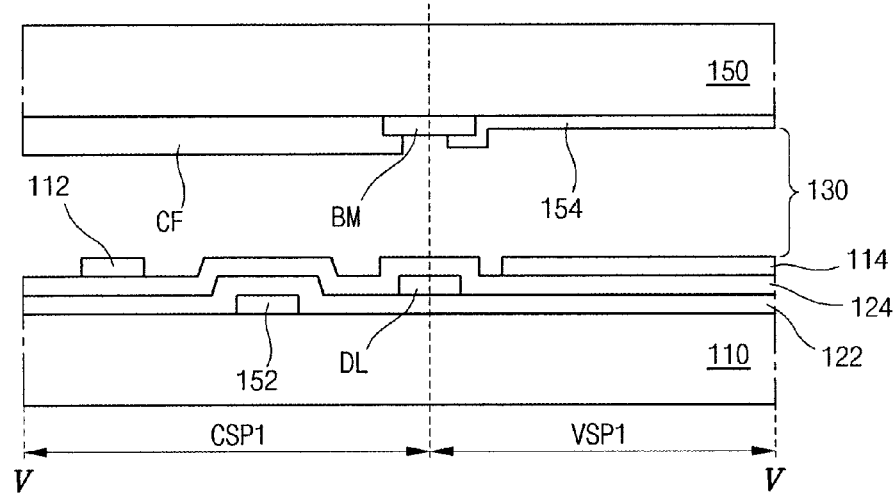
FIG. 5 is a cross-sectional view taken along line V-V of FIGS. 4A and 4B.
Figure 6:
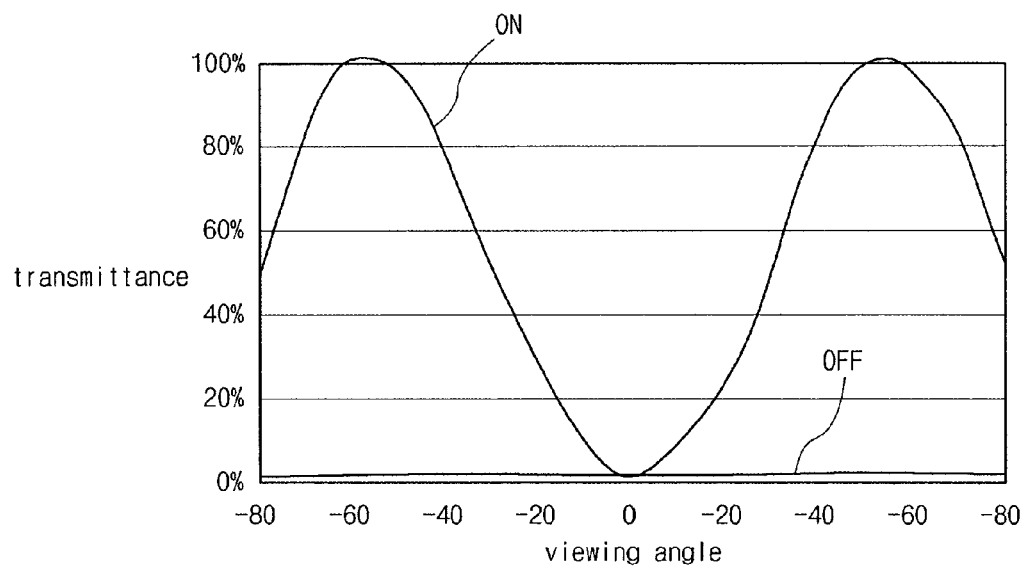
FIG. 6 is a graph showing a light transmittance property in a viewing angle restricting sub-pixel of a viewing angle restricting LCD device according to embodiments of the invention.

FIGS. 4A and 4B are plane views respectively showing an array substrate and a color filter substrate for a viewing angle restricting LCD device according to a first exemplary embodiment of the invention and FIG. 5 is a cross-sectional view taken along line V-V of FIGS. 4A and 4B. FIG. 6 is a graph showing a light transmittance property in a viewing angle restricting sub-pixel of a viewing angle restricting LCD device according to embodiments of the invention.

As shown in FIGS. 4A, 4B and 5, a viewing angle restricting LCD device according to embodiments of the invention includes first and second substrates 110 and 150 and a layer of liquid crystal molecules 130 interposed therebetween. A unit pixel, which includes first to third color displaying sub-pixels CSP1, CSP2 and CSP3 and first to third viewing angle restricting sub-pixels VSP1, VSP2 and VSP3, is defined on the first and second substrates 110 and 150. The first to third color displaying sub-pixels CSP1, CSP2 and CSP3 correspond one-to-one with the first to third viewing angle restricting sub-pixels VSP1, VSP2 and VSP3. The first to third color displaying sub-pixels CSP1, CSP2 and CSP3 are sequentially arranged as a column in the unit pixel, and the first to third viewing angle restricting sub-pixels VSP1, VSP2 and VSP3 are sequentially arranged in a second column in the unit pixel.

The first substrate 110 includes gate lines GL, data lines DL, and thin film transistors (TFTs) T. The gate and data lines GL and DL cross each other to define each sub-pixel CSP1, CSP2, CSP3, VSP1, VSP2 and VSP3. The TFTs T are respectively formed in each sub-pixel CSP1, CSP2, CSP3, VSP1, VSP2 and VSP3 and connected to the gate and data lines GL and DL. The second substrate 150 includes a black matrix BM corresponding to the gate and data lines GL and DL, and the TFT T.

A first common line Vom1, first common electrodes 152 and first pixel electrodes 112 are formed in the first to third color displaying sub-pixels CSP1, CSP2 and CSP3 on the first substrate 110. The first common lines Vcom1 are parallel to the gate line GL and separated from the gate line GL. A first common voltage is applied onto the first common electrodes 152 through the first common lines Vcom1. The first common electrodes 152 extend from the first common lines Vcom1 formed between the color displaying sub-pixels CSP1, CSP2 and CSP3. The first pixel electrodes 112 are connected to the TFTs T in the color displaying sub-pixels CSP1, CSP2 and CSP3. The first common electrodes 152 and the first pixel electrodes 112 are alternately arranged with each other and parallel to each other. The first common electrodes 152 and the first pixel electrodes 112 have a bent bar shape. Moreover, the gate and data lines GL and DL can also have the bent bar shape. The viewing angle restricting LCD device having the first common electrodes 152 and the first pixel electrodes 112 with the bent bar shape has multiple domains such that the viewing angle is improved. In the alternative, the first common electrodes 152 and the first pixel electrodes 112 may have a linear bar shape.

When voltages are applied across the first pixel electrodes 112 and the first common electrodes 152, horizontal electric fields are induced between the first pixel electrodes 112 and the first common electrodes 152. The layers of liquid crystal molecules 130 are driven by the horizontal electric fields. Different voltages generate different gray levels.

A color filter layer CF having red, green and blue colors is formed in the first to third color displaying sub-pixels CSP1, CSP2 and CSP3 on the second substrate 150. The first color displaying sub-pixel CSP1 on the second substrate 150 corresponds to the first color displaying sub-pixel CSP1 on the first substrate 110. The second color displaying sub-pixel CSP2 on the second substrate 150 corresponds to the second color displaying sub-pixel CSP2 on the first substrate 110. The third color displaying sub-pixel CSP3 on the second substrate 150 corresponds to the third color displaying sub-pixel CSP3 on the first substrate 110.

Second pixel electrodes 114 are formed in the first to third viewing angle restricting sub-pixels VSP1, VSP2 and VSP3 on the first substrate 110. The second pixel electrodes 114 are connected to TFTs T in the first to third viewing angle restricting sub-pixels VSP1, VSP2 and VSP3. Moreover, second common lines Vcom2 and second common electrodes 154 are formed in the first to third viewing angle restricting sub-pixels VSP1, VSP2 and VSP3 on the second substrate 150. The first viewing angle restricting sub-pixel VSP1 on the first substrate 110 corresponds to the first viewing angle restricting sub-pixel VSP1 on the second substrate 150. The second viewing angle restricting sub-pixel VSP2 on the first substrate 110 corresponds to the second viewing angle restring sub-pixel VSP2 on the second substrate 150. The third viewing angle restricting sub-pixel VSP3 on the first substrate 110 corresponds to the third viewing angle restring sub-pixel VSP3 on the second substrate 150.

A second common voltage is applied onto the second common electrodes 154 through the second common lines Vcom2. The second pixel electrodes 114 and the second common electrodes 154 can each have plate shapes that respectively cover the first to third viewing angle restricting sub-pixels VSP1, VSP2 and VSP3 on the first and second substrates 110 and 150, respectively. The second common voltage may be applied to the second common electrodes 154 by additional lines in a non-display region without the second common line Vcom2.

When the same voltage is applied onto the second pixel electrode 114 and the second common electrode 154 of a sub-pixel, the layer of liquid crystal molecules 130 is not driven such that the sub-pixel displays a black image. When a voltage is applied across the second pixel electrode 114 and the second common electrode 154 of a sub-pixel, the layer of liquid crystal molecules 130 is driven by a vertical electric field between the second pixel electrode 114 and the second common electrode 154 such that the sub-pixel has maximum transmittance of white light at side viewing angles.

The liquid crystal molecules in the liquid crystal layer 130 can be aligned to have an angle of either 90 degrees or 270 degrees with respect to the gate lines GL. The first and second polarizers (not shown) having first and second optical axes, respectively, are disposed on outer surfaces of the first and second substrates 110 and 150. The first and second optical axes can be oriented at 0 degree and 90 degrees with respect to the gate lines GL, respectively. Accordingly, the first and second optical axes are perpendicular to each other.

When the first and second optical axes are perpendicular to each other and the liquid crystal molecules 130, which have an initial alignment of either 90 degrees or 270 degrees, are driven by the oblique electric fields between the first pixel electrodes 112 and the first common electrodes 152, the first to third color displaying sub-pixels CSP1, CSP2 and CSP3 have a wide viewing angle for displaying the image. The driving of the layers of liquid crystal molecules 130 in the first to third viewing angle restricting sub-pixels VSP1, VSP2 and VSP3 is determined by voltages applied onto the second pixel electrodes 114 and the second common electrodes 154 such that the first to third viewing angle restricting sub-pixels VSP1, VSP2 and VSP3 can selectively restrict the viewing angle.

In an ON state, in which the same voltages are applied onto the second pixel electrodes 114 and the second common electrodes 154, the first to third viewing angle restricting sub-pixels VSP1, VSP2 and VSP3 have a maximum transmittance at 60 degrees from the front viewing angle and a minimum transmittance at the front viewing angle. In a left direction and a right direction from a point having the maximum transmittance, the first to third viewing angle restricting sub-pixels VSP1, VSP2 and VSP3 have transmittance but less than the maximum transmittance. In an OFF state, in which voltages are applied across the second pixel electrodes 114 and the second common electrodes 154, the first to third viewing angle restricting sub-pixels VSP1, VSP2 and VSP3 have about zero transmittance in all viewing angles. In this case, a voltage difference between voltages applied across the second pixel electrodes 114 and the second common electrodes 154 may be less than 3 V.

Since the first to third viewing angle restricting sub-pixels VSP1, VSP2 and VSP3 display black images in all viewing angles in the OFF state, the first to third color displaying sub-pixels CSP1, CSP2 and CSP3 display images in all viewing angles without the image being affected by the first to third viewing angle restricting sub-pixels VSP1, VSP2 and VSP3. On the other hand, the first to third viewing angle restricting sub-pixels VSP1, VSP2 and VSP3 display black images in the front viewing angle and white images in the side viewing angles in the ON state such that the first to third color displaying sub-pixels CSP1, CSP2 and CSP3 do not clearly display images in the side viewing angles due to the first to third viewing angle restricting sub-pixels VSP1, VSP2 and VSP3 corrupting the side viewing angles with white images while the first to third color displaying sub-pixels CSP1, CSP2 and CSP3 display images in the front viewing angle that are not affected by the first to third viewing angle restricting sub-pixels VSP1, VSP2 and VSP3.

When the first to third viewing angle restricting sub-pixels VSP1, VSP2 and VSP3 are in the ON state, images from each unit pixel have substantially a same luminance at the side viewing angles. Accordingly, differences of luminance in the first to third color displaying sub-pixels CSP1, CSP2 and CSP3 in the side viewing angles are compensated by the white luminance of first to third viewing angle restricting sub-pixels VSP1, VSP2 and VSP3 in the side viewing angles such that the side viewing angles are restricted. As a result, only a person at the front viewing angle can observe the image, while a person at a side viewing angle can not observe the image.

The above-mentioned viewing angle restricting LCD device has the first to third color displaying sub-pixels CSP1, CSP2 and CSP3 driven by horizontal electric fields. Further, the first to third viewing angle restricting sub-pixels VSP1, VSP2 and VSP3 are driven by vertical electric fields. However, the first to third color displaying sub-pixels CSP1, CSP2 and CSP3 and the first to third viewing angle restricting sub-pixels VSP1, VSP2 and VSP3 may be driven by another types of fields.

As shown in FIG. 5, first gate insulating layers 122 are formed between the first common electrodes 152 and the data lines DL, and second gate insulating layers 124 are formed between the data lines DL and the first pixel electrodes 112. However, the first common electrodes 152 and the first pixel electrodes 112 may be formed in a same layer as each other without one of the first and second gate insulating layers 122 and 124.

Figure 7A:
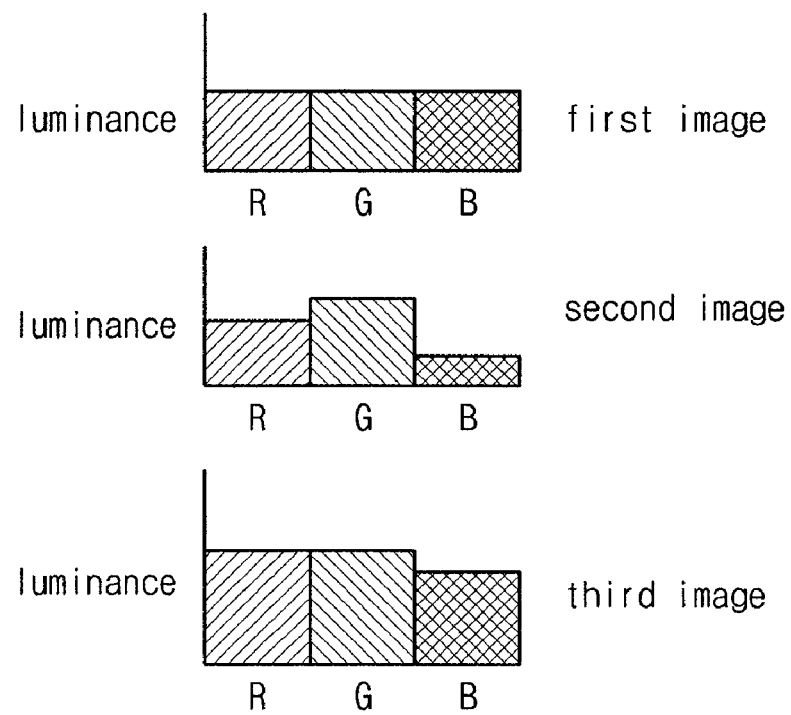
FIGS. 7A and 7B show properties of color luminance and a gray level in a color displaying sub-pixel of a viewing angle restricting LCD device according to embodiments of the invention.
Figure 7B:
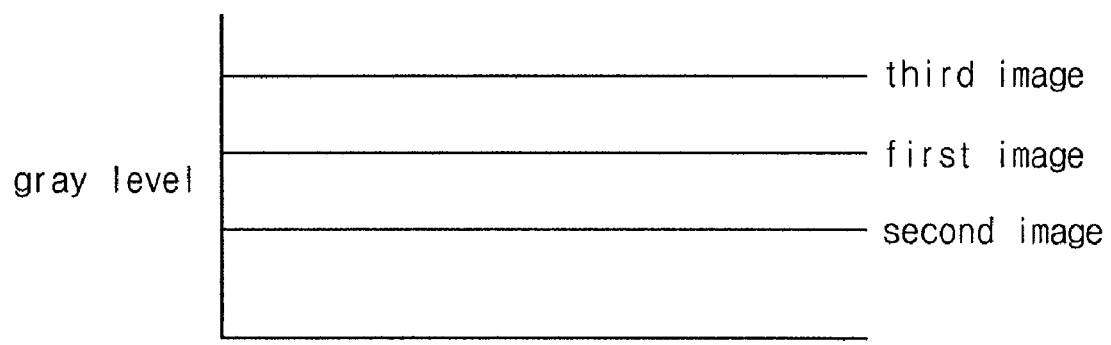
Figure 7C:
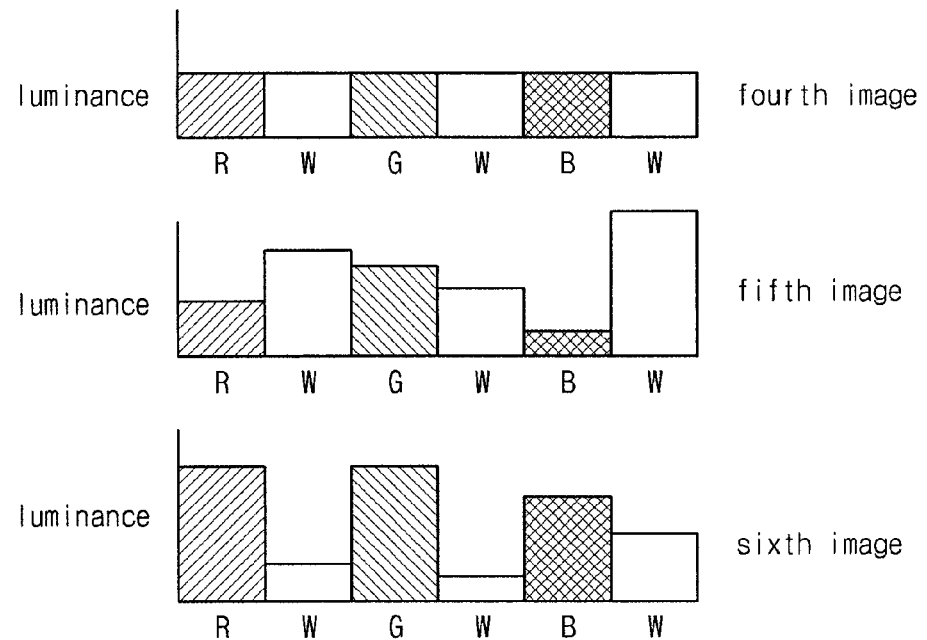
FIGS. 7C and 7D show properties of color luminance and a gray level in a color displaying sub-pixel and a viewing angle restricting sub-pixel of a viewing angle restricting LCD device according to embodiments of the invention.
Figure 7D:
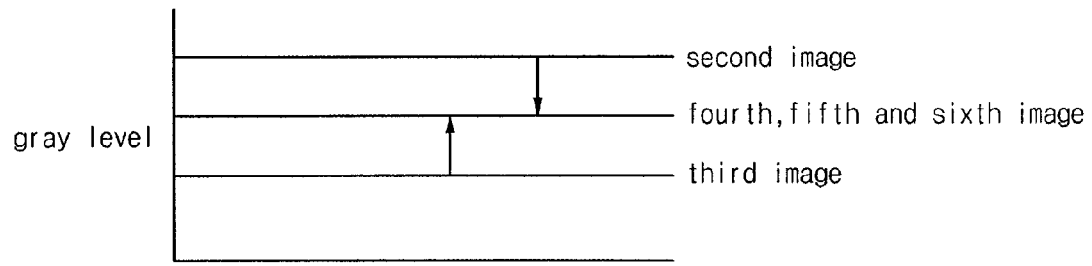

In reference to FIGS. 7A to 7D, the above-mentioned compensation effects will be explained. FIGS. 7A and 7B show properties of color luminance and a gray level in a color displaying sub-pixel of a viewing angle restricting LCD device according to embodiments of the invention. FIGS. 7C and 7D show properties of color luminance and a gray level in a color displaying sub-pixel and a viewing angle restricting sub-pixel of a viewing angle restricting LCD device according to embodiments of the invention.

As shown in FIGS. 7A and 7B, first to third images have different luminances from each other. Each of the first to third images includes red, green and blue colors R, G and B. Moreover, the first to third images may have different gray levels. Accordingly, when the liquid crystal device of the invention is in viewing angle restricting mode, in which the first to third viewing angle restricting sub-pixels VSP1, VSP2 and VSP3 are in the ON state, it is possible to observe images having different gray levels at the front viewing angle in spite of the first to third viewing angle restricting sub-pixels VSP1, VSP2 and VSP3. Thus, the first to third viewing angle restricting sub-pixels VSP1, VSP2 and VSP3 displays white images according to the gray level of the images from the first to third color displaying sub-pixels CSP1, CSP2 and CSP3. The first to third viewing angle restricting sub-pixels VSP1, VSP2 and VSP3 are controlled such that the images from the first to third color displaying sub-pixels CSP1, CSP2 and CSP3 at a side viewing angle have a same gray level as a standard gray level.

As shown in FIGS. 7C and 7D, the LCD device displays fourth to sixth images having different luminances depending on their colors. The luminances of red, green and blue colors R, G and B in the fourth image correspond to the luminances of red, green and blue colors R, G and B in the first image in FIGS. 7A and 7B, and the luminances of red, green and blue colors R, G and B in the fifth image correspond to the luminances of red, green and blue colors R, G and B in the second image in FIGS. 7A and 7B. Moreover, the luminances of red, green and blue colors R, G and B in the sixth image correspond to the luminances of red, green and blue colors R, G and B in the third image in FIGS. 7A and 7B. The images of white color W have different luminances depending on the images from the fourth to sixth images. As mentioned above, the images of white color are displayed from the first to third viewing angle restricting sub-pixels VSP1, VSP2 and VSP3, and the fourth to sixth images are displayed from the first to third color displaying sub-pixels CSP1, CSP2 and CSP3.

The driving method mentioned above is explained in more detail with FIGS. 7C and 7D. As shown in FIG. 7C, first to third white colors W1, W2 and W3 correspond to red, green and blue color images R, G and B. When the red, green and blue colors R, G and B have a same luminance as each other as the fourth image in FIG. 7C, the first to third viewing angle restricting sub-pixels VSP1, VSP2 and VSP3 are driven so that the first to third white colors W1, W2 and W3 in the fourth images have a same luminance as each other. In other words, when the red color R has luminance greater than the blue color B and less than the green color G as the fifth image, the first to third viewing angle restricting sub-pixels VSP1, VSP2 and VSP3 are driven so that the first white color W1 has luminance greater than the second white color W2 and less than the third white color W3. When the red color R has a luminance, which is same as the green color G and greater than the blue color B, as the sixth image, the first to third viewing angle restricting sub-pixels VSP1, VSP2 and VSP3 are driven so that the first white color W1 has a luminance, which is same as the second white color W2 and less than the third white color W3.

When the first to third viewing angle restricting sub-pixels VSP1, VSP2 and VSP3 are driven by the above-mentioned method, the fourth to sixth images have different luminances depending on their colors. However, the fourth to sixth images appear to have substantially the same gray level when viewed at side viewing angles. In other words, as shown in FIG. 7D, the gray levels of the second and third images shift up and down such that the fourth to sixth images have the same gray level at side viewing angles. Accordingly, the LCD device according to embodiments of the invention having and driving as mentioned above displays images having substantially the same gray level to improve the effect of restricting the side viewing angles.

When the TFTs T in the first to third color displaying sub-pixels CSP1, CSP2 and CSP3 are turned on, the layers of liquid crystal molecules 130 are driven by the horizontal electric fields induced between the first pixel electrodes 112 and the first common electrodes 152 to display images having a wide viewing angle. When the TFTs T in the first to third viewing angle restricting sub-pixels VSP1, VSP2 and VSP3 are turned on, the layers of liquid crystal molecules 130 are driven by the vertical electric fields induced between the second pixel electrodes 114 on the first substrate 110 and the second common electrodes 154 on the second substrate 150. When voltages are applied across the second pixel electrodes 114 and the second common electrodes 154, the first to third viewing angle restricting sub-pixels VSP1, VSP2 and VSP3 do not display the white color into the front viewing angle but do emit light into the side viewing angles. Thus, the images from the first to third color displaying sub-pixels CSP1, CSP2 and CSP3 at the side viewing angles are corrupted by the first to third viewing angle restricting sub-pixels VSP1, VSP2 and VSP such that the viewing angles at the sides are restricted. Thus, the LCD device according to embodiments of the invention has a narrow viewing angle mode.

On the other hand, when the same voltage is applied onto the second pixel electrodes 114 and the second common electrodes 154, the first to third viewing angle restricting sub-pixels VSP1, VSP2 and VSP3 do not display the white color at the side viewing angles so that the image can be observed in all viewing angles from the first to third color displaying sub-pixels CSP1, CSP2 and CSP3. In this case, the first to third viewing angle restricting sub-pixels VSP1, VSP2 and VSP3 do not restrict viewing angles. Thus, the LCD device according to embodiments of the invention also has a wide viewing angle mode.

The LCD device according to embodiments of the invention has convertibility between wide and narrow viewing angle modes depending on the first to third viewing angle restricting sub-pixels VSP1, VSP2 and VSP3 being turned on. Although not shown, the LCD device may include a gray level determining unit, a luminance detecting unit and a luminance compensating unit. The gray level determining unit determines the standard gray level. The luminance detecting unit detects luminances of the images displayed in the first to third color displaying sub-pixels CSP1, CSP2 and CSP3. The luminance compensating unit determines luminances of the white color in the first to third viewing angle restricting sub-pixels VSP1, VSP2 and VSP3 depending on the luminance of the images detected by the luminance detecting unit. The voltages, which are applied onto the second pixel electrodes 114 in the first to third viewing angle restricting sub-pixels VSP1, VSP2 and VSP3, are determined by the luminance compensating unit.

Figure 8A:
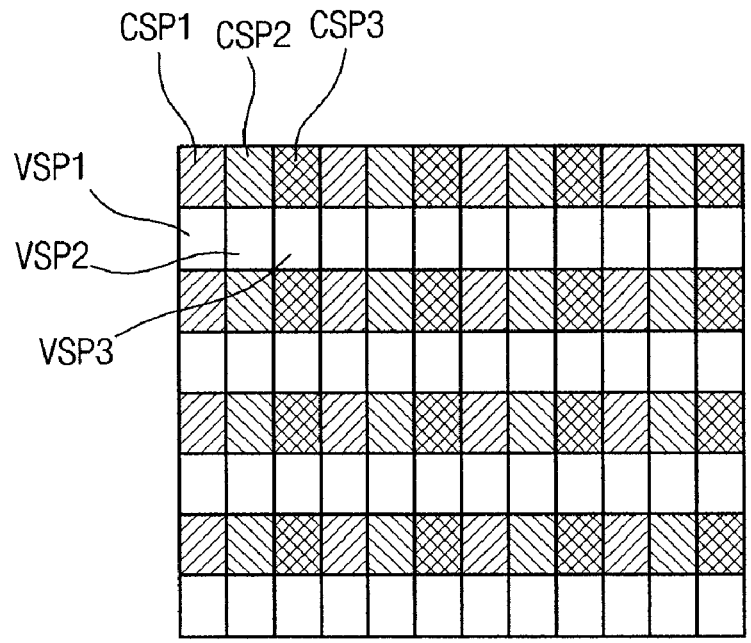
FIGS. 8A to 8C are plane views showing a viewing angle restricting LCD device according to second to fourth exemplary embodiments of the invention.
Figure 8B:
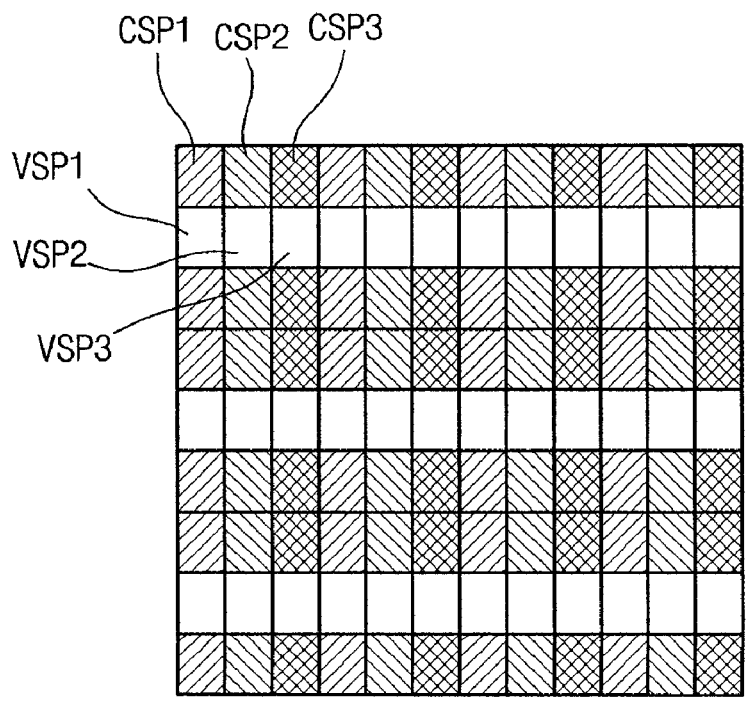
Figure 8C:
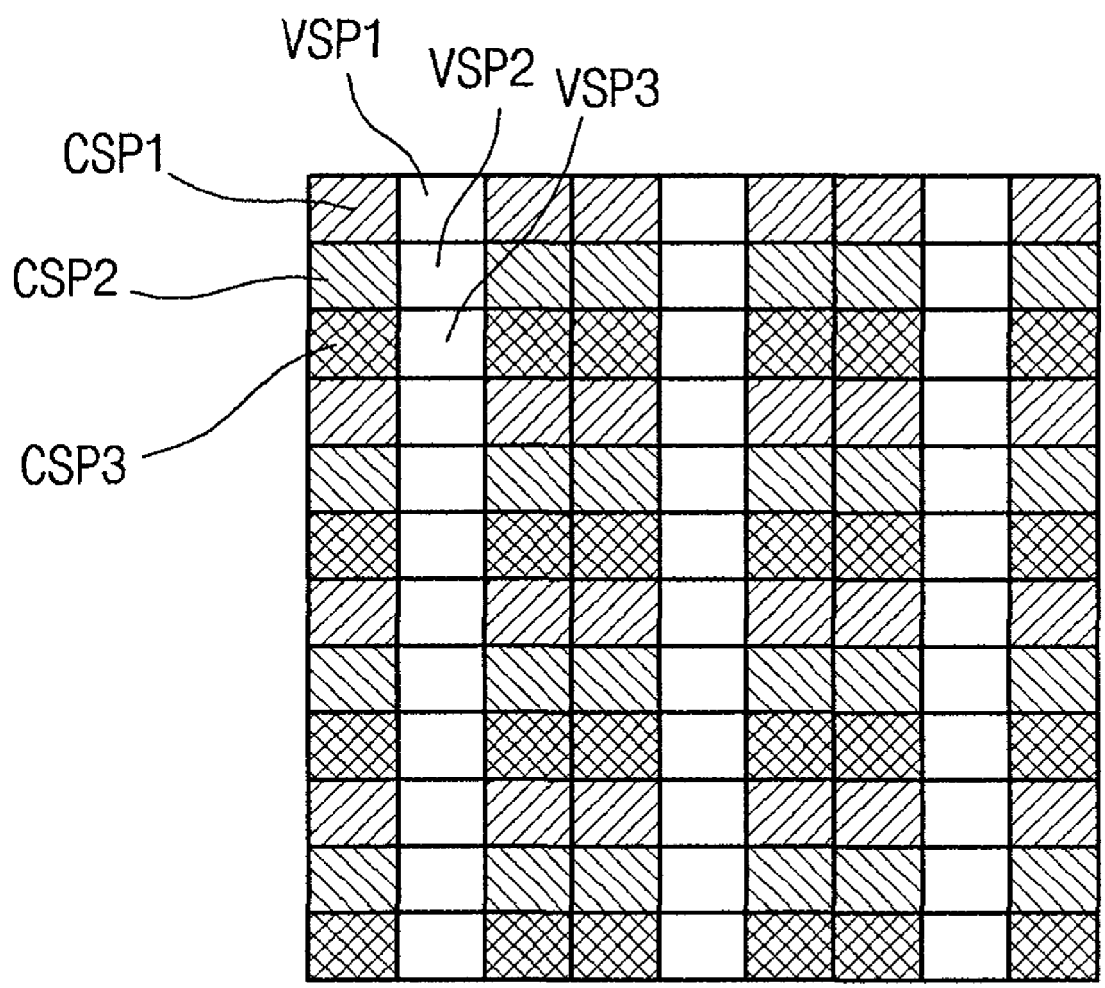

FIGS. 8A to 8C are plane views showing a viewing angle restricting LCD device according to second to fourth exemplary embodiments of the invention, respectively. The LCD devices in FIGS. 8A to 8C include a unit pixel. The unit pixel includes the first to third color displaying sub-pixels CSP1, CSP2 and CSP3 and the first to third viewing angle restricting sub-pixels VSP1, VSP2 and VSP3. As mentioned above, the first to third viewing angle restricting sub-pixels VSP1, VSP2 and VSP3 display white colors depending on the images from the first to third color displaying sub-pixels CSP1, CSP2 and CSP3.

As shown in FIG. 8A, in the viewing angle restricting LCD device according to the second exemplary embodiment of the invention, the first to third color displaying sub-pixels CSP1, CSP2 and CSP3 are alternately arranged with one another in (2N−1)th rows, and the first to third viewing angle restricting sub-pixels VSP1, VSP2 and VSP3 are alternately arranged with one another in (2N)th rows where N is a positive integer. When the viewing angle restricting sub-pixels VSP1, VSP2 and VSP3 have too small area, the LCD device does not have a sufficient viewing angle restricting function. However, when the viewing angle restricting sub-pixels VSP1, VSP2 and VSP3 have too broad an area, the LCD device has a decreased aperture ratio and decreased luminance. Considering the viewing angle restricting function and the aperture ratio, area of the viewing angle restricting sub-pixels VSP1, VSP2 and VSP3 can be between 10 percent and 50 percent of the area of the unit pixel.

FIGS. 8B and 8C show the viewing angle restricting LCD device having an improved aperture ratio. As shown in FIG. 8B, in the viewing angle restricting LCD device according to the third exemplary embodiment of the invention, the first to third color displaying sub-pixels CSP1, CSP2 and CSP3 are alternately arranged with one another in (3N−2)th rows and (3N)th rows, and the viewing angle restricting sub-pixels VSP1, VSP2 and VSP3 are alternately arranged with one another in (3N−1)th rows. Moreover, as shown in FIG. 8C, in the viewing angle restricting LCD device according to the fourth exemplary embodiment of the invention, the first to third color displaying sub-pixels CSP1, CSP2 and CSP3 are alternately arranged with one another in (3N−2)th columns and (3N)th columns, and the viewing angle restricting sub-pixels VSP1, VSP2 and VSP3 are alternately arranged with one another in (3N−1)th columns. In FIGS. 8B and 8C, one viewing angle restricting sub-pixel matches with two color displaying sub-pixels such that area occupied by the viewing angle restricting sub-pixels is decreased. As a result, the aperture ratio and luminance are improved.

Figure 9A:
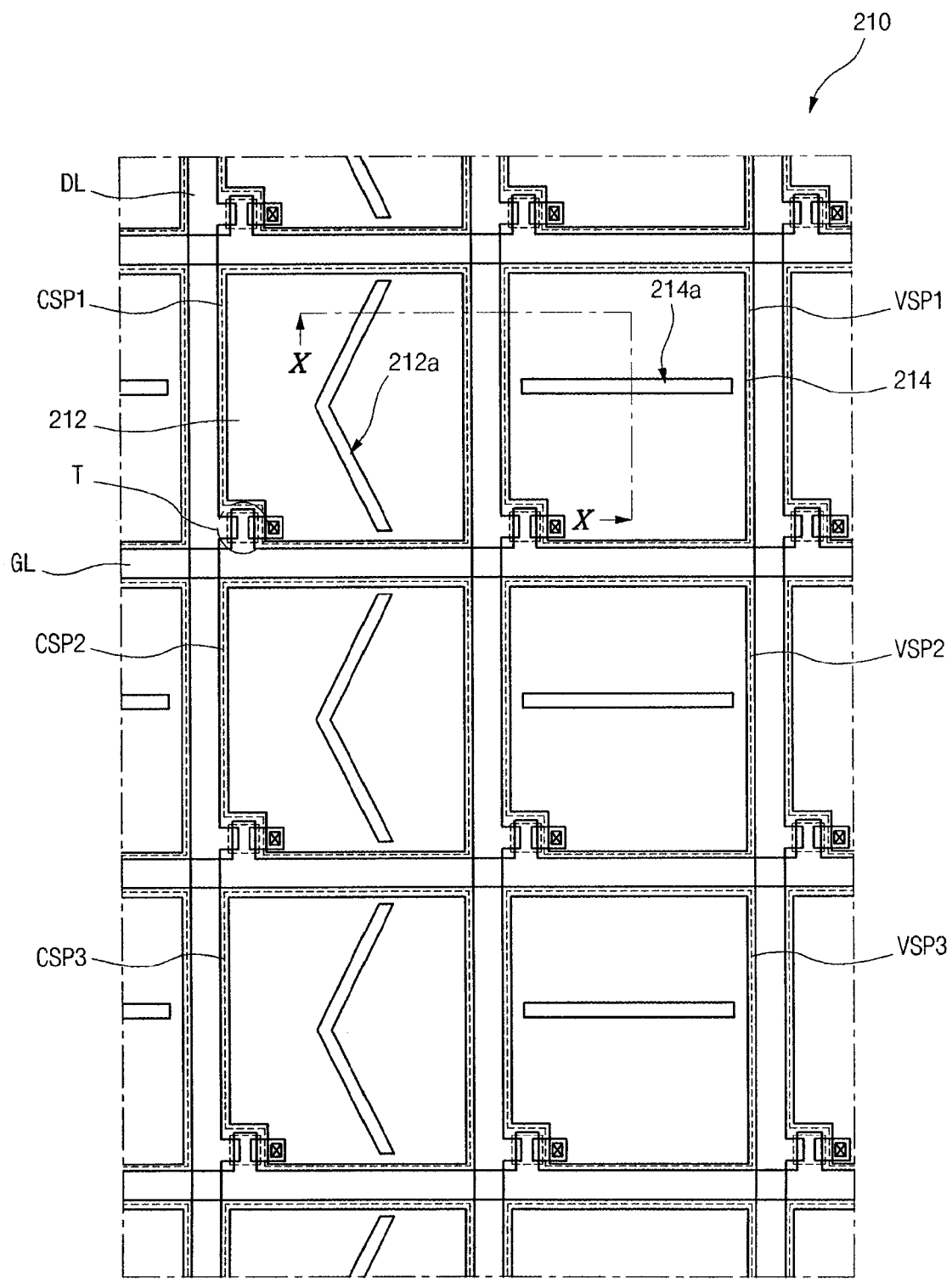
FIGS. 9A and 9B are plane views showing an array substrate and a color filter substrate for a viewing angle restricting LCD device according to a fifth exemplary embodiment of the invention, respectively.
Figure 9B:
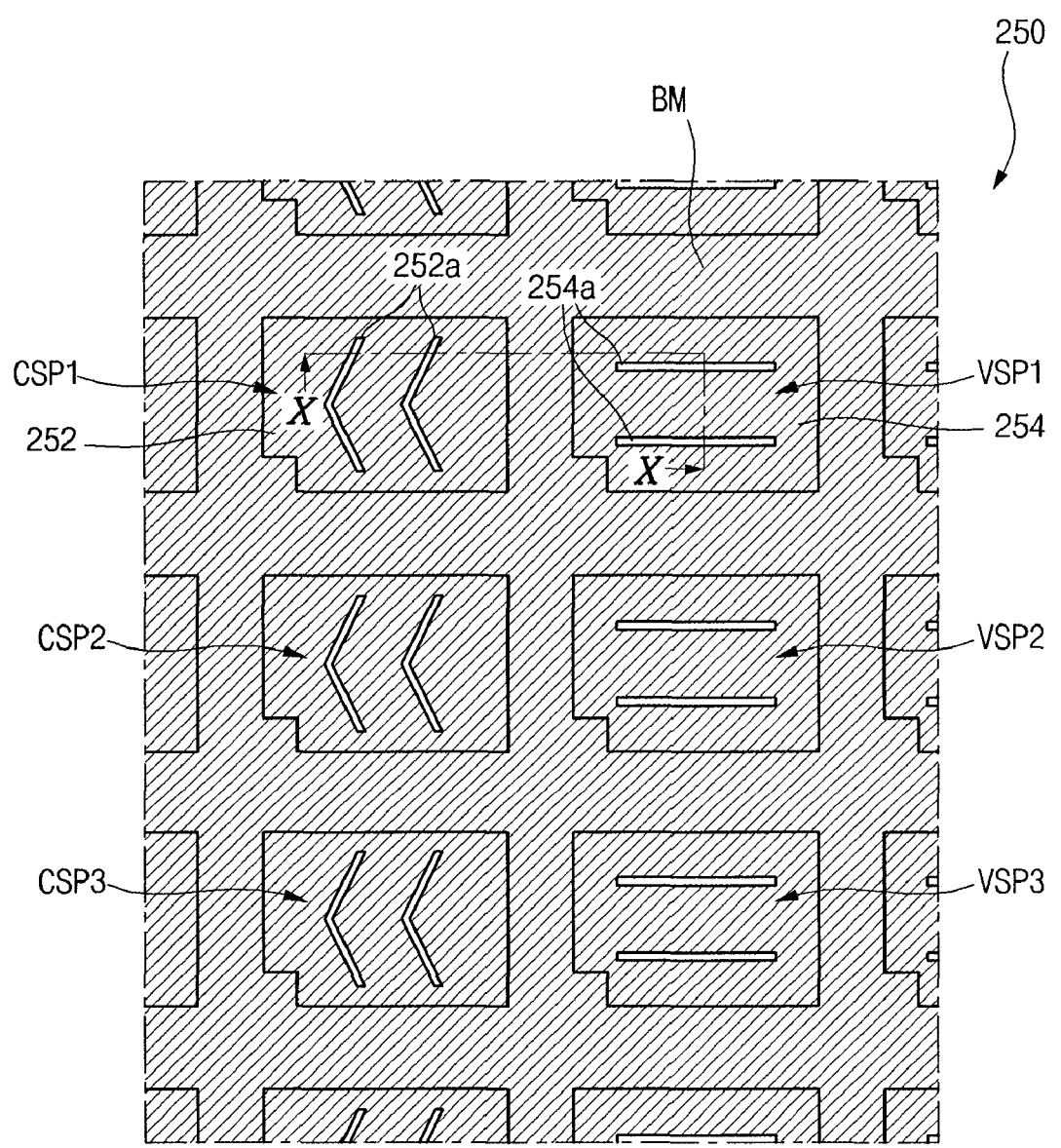
Figure 10:
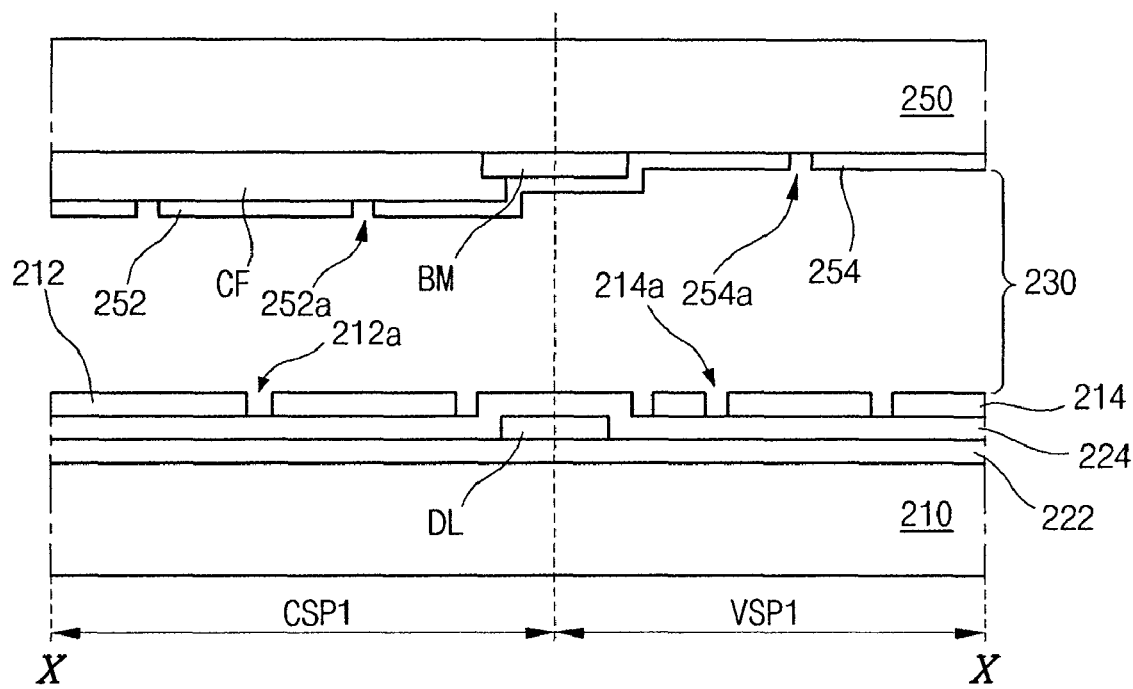
FIG. 10 is a cross-sectional view taken along line X-X of FIGS. 9A and 9B.

FIGS. 9A and 9B are plane views showing an array substrate and a color filter substrate for a viewing angle restricting LCD device according to a fifth exemplary embodiment of the invention, respectively, and FIG. 10 is a cross-sectional view taken along the line X-X of FIGS. 9A and 9B. As shown in FIGS. 9A, 9B and 10, the viewing angle restricting LCD device includes first and second substrates 210 and 250 facing each other, and a layer of liquid crystal molecules 230 interposed therebetween. The unit pixel, which includes the first to third color displaying sub-pixels CSP1, CSP2 and CSP3 and the first to third viewing angle restricting sub-pixels VSP1, VSP2 and VSP3, is defined on the first and second substrates 210 and 250. The first to third color displaying sub-pixels CSP1, CSP2 and CSP3 correspond one-to-one with the first to third viewing angle restricting sub-pixels VSP1, VSP2 and VSP3. The first to third color displaying sub-pixels CSP1, CSP2 and CSP3 are sequentially arranged in a first column of the unit pixel, and the first to third viewing angle restricting sub-pixels VSP1, VSP2 and VSP3 are sequentially arranged in a second column of the unit pixel.

The first substrate 210 includes gate lines GL, data lines DL, and TFTs T. The gate and data lines GL and DL cross each other to define each sub-pixel CSP1, CSP2, CSP3, VSP1, VSP2 and VSP3. The TFTs T are respectively formed in the each sub-pixel CSP1, CSP2, CSP3, VSP1, VSP2 and VSP3 and connected to the gate and data lines GL and DL. First insulating layers 222 may be formed between the gate lines GL and the data lines DL, and second insulating layers 224 may be formed on the data lines DL. The second substrate 250 includes a black matrix BM corresponding to the gate and data lines GL and DL, and the TFT T.

First slits 212a are formed in the first pixel electrodes 212 in the first to third color displaying sub-pixels CSP1, CSP2 and CSP3 on the first substrate 210. The first slits 212a have a bent bar shape. The first slits 212a can have angles of either 45 degrees or 315 degrees with respect to the gate lines GL.

The color filter layer CF is formed in the first to third color displaying sub-pixels CSP1, CSP2 and CSP3, and the first common electrode areas 252 is formed on the color filter layer CF. The color filter layer CF includes red, green and blue colors. Second slits 252a having the bent bar shape are formed in the first common electrode areas 252. The second slits 252a are alternately arranged with the first slits 212a and parallel to the first slits 212a.

The first and second slits 212a and 252a have the bent bar shape, as shown in FIGS. 9A and 9B. In the alternative, the first and second slits 212a and 252a may have a linear bar shape. Moreover, the data lines DL, the first pixel electrodes 212 and the first common electrode areas 252 may have a same bent bar shape as the first and second slits 212a and 252a. The sub-pixels have a mono-domain in the case of the linear bar shape. The sub-pixels have multiple domains in the case of the bent bar shape have a wider viewing angle.

When voltages are applied across the first pixel electrodes 212 and the first common electrode areas 252, the electric fields induced between the first pixel electrodes 212 and the first common electrode 252 areas are distorted by the first and second slits 212a and 252a such that oblique electric fields are formed. The layer of liquid crystal molecules 230 is driven by the oblique electric fields such that the viewing angle is improved. The oblique electric fields cross the first and second slits 212a and 252a such that the liquid crystal molecules 230 are arranged depending on the oblique electric fields and have an angle of either 45 degrees or 315 degrees with respect to the gate lines GL. When the first and second slits 212a and 252a have the linear bar shape, in which the first and second slits are parallel to the data lines DL, the liquid crystal molecules are parallel to the gate lines GL.

Second pixel electrodes 214 are formed in the first to third viewing angle restricting sub-pixels VSP1, VSP2 and VSP3 on the first substrate 210, the second common electrode areas 254 corresponding to the second pixel electrodes 214 is formed in the first to third viewing angle restricting sub-pixels VSP1, VSP2 and VSP3 on the second substrate 250. Third slits 214a, which are parallel to the gate lines GL and have a linear bar shape, are formed in the second pixel electrodes 214, and fourth slits 254a, which are parallel to the third slits 214a and alternately arranged with the third slits 214a, are formed in the second common electrode areas 254.

When voltages are applied across the second pixel electrodes 214 and the second common electrodes 254, electric fields are induced between the second pixel electrodes 214 and the second common electrode area 254 are distorted by the third and fourth slits 214a and 254a such that the electric fields become oblique. The oblique electric fields cross the third and fourth slits 214a and 254a such that the liquid crystal molecules 230 are arranged depending on the oblique electric fields and can have an angle of 0 degree with respect to the data lines DL. In other words, the liquid crystal molecules 230 are arranged to be perpendicular to the gate lines GL. Since the oblique electric fields in the first to third viewing angle restricting sub-pixels VSP1, VSP2 and VSP3 are perpendicular to the gate lines GL, the first to third viewing angle restricting sub-pixels VSP1, VSP2 and VSP3 have a transmittance of 0 percent in the front viewing angle. Certain side viewing angles to the left and right of the front viewing angle have increased transmittance such that the first to third viewing angle restricting sub-pixels VSP1, VSP2 and VSP3 have a maximum transmittance. Further to the left and right sides from the certain viewing angles having the maximum transmittance, the transmittance decreases. The certain viewing angles can be 60 degrees from the front viewing angle.

The liquid crystal molecules in the liquid crystal layer 130 can be aligned to have an angle of either 90 degrees or 270 degrees with respect to the gate lines GL. First and second polarizers (not shown) having first and second optical axes, respectively, are disposed on outer surfaces of the first and second substrates 110 and 150. The first and second optical axes can be either 0 degrees or 90 degrees with respect to the gate lines, respectively. Accordingly, the first and second optical axes are perpendicular to each other.

When the first and second optical axes are perpendicular to each other and the liquid crystal layer 130, which has an initial alignment of one of 90 degrees and 270 degrees, is driven by the electric fields between the first pixel electrodes 212 and the first common electrode areas 252, the first to third color displaying sub-pixels CSP1, CSP2 and CSP3 have a wide viewing angle. When voltages are applied across the second pixel electrodes 214 and the second common electrode areas 254, the first to third viewing angle restricting sub-pixels VSP1, VSP2 and VSP3 display the white color at side viewing angles and do not display the white color at the front viewing angle such that the users in the side viewing angles do not observe the images from the first to third color displaying sub-pixels CSP1, CSP2 and CSP3 at the side viewing angles. Accordingly, the viewing angle restricting LCD device can have a narrow viewing angle mode.

When the same voltage is applied onto the second pixel electrodes 214 and the second common electrode areas 254, the first to third viewing angle restricting sub-pixels VSP1, VSP2 and VSP3 have substantially 0 percent transmittance at all viewing angles such that the users at all viewing angles can observe the images from the first to third color displaying sub-pixels CSP1, CSP2 and CSP3. Accordingly, the viewing angle restricting LCD device also has a wide viewing angle mode. As a result, the viewing angle restricting LCD device of the above-described fifth exemplary embodiment has convertibility between the wide and narrow viewing angle modes.

In the above-mentioned fifth exemplary embodiment, the first to fourth slits 212a, 252a, 214a, 254a have different shapes with the above-mentioned shapes depending on the alignment direction of the liquid crystal molecules and the optical axes of the first and second polarizers (not shown). Moreover, the first to third color displaying sub-pixels CSP1, CSP2 and CSP3 and the first to third viewing angle restricting sub-pixels VSP1, VSP2 and VSP3 may be driven as shown in FIGS. 7A to 7D.

Figure 11A:
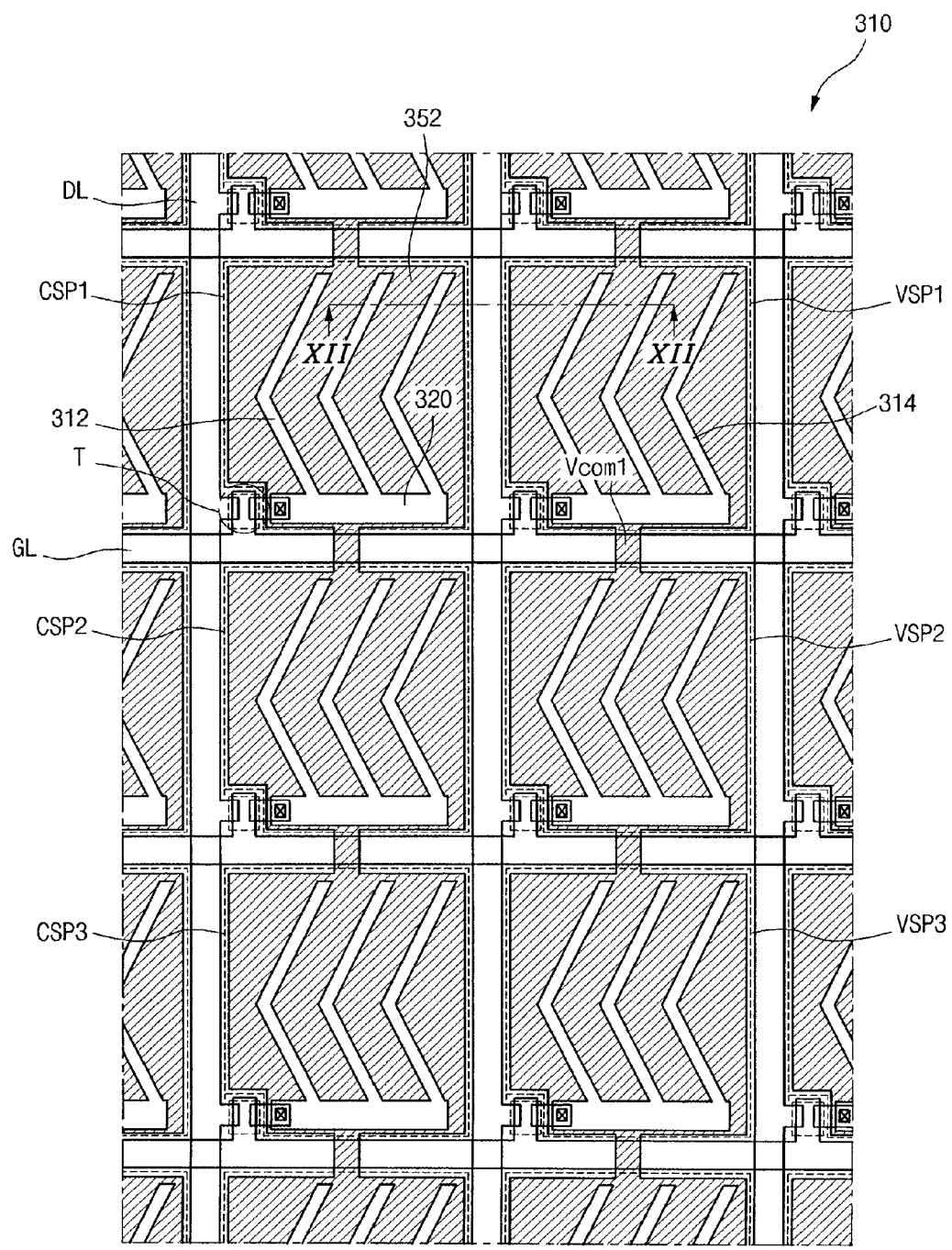
FIGS. 11A and 11B are plane views showing an array substrate and a color filter substrate for a viewing angle restricting LCD device according to a sixth exemplary embodiment of the invention, respectively.
Figure 11B:
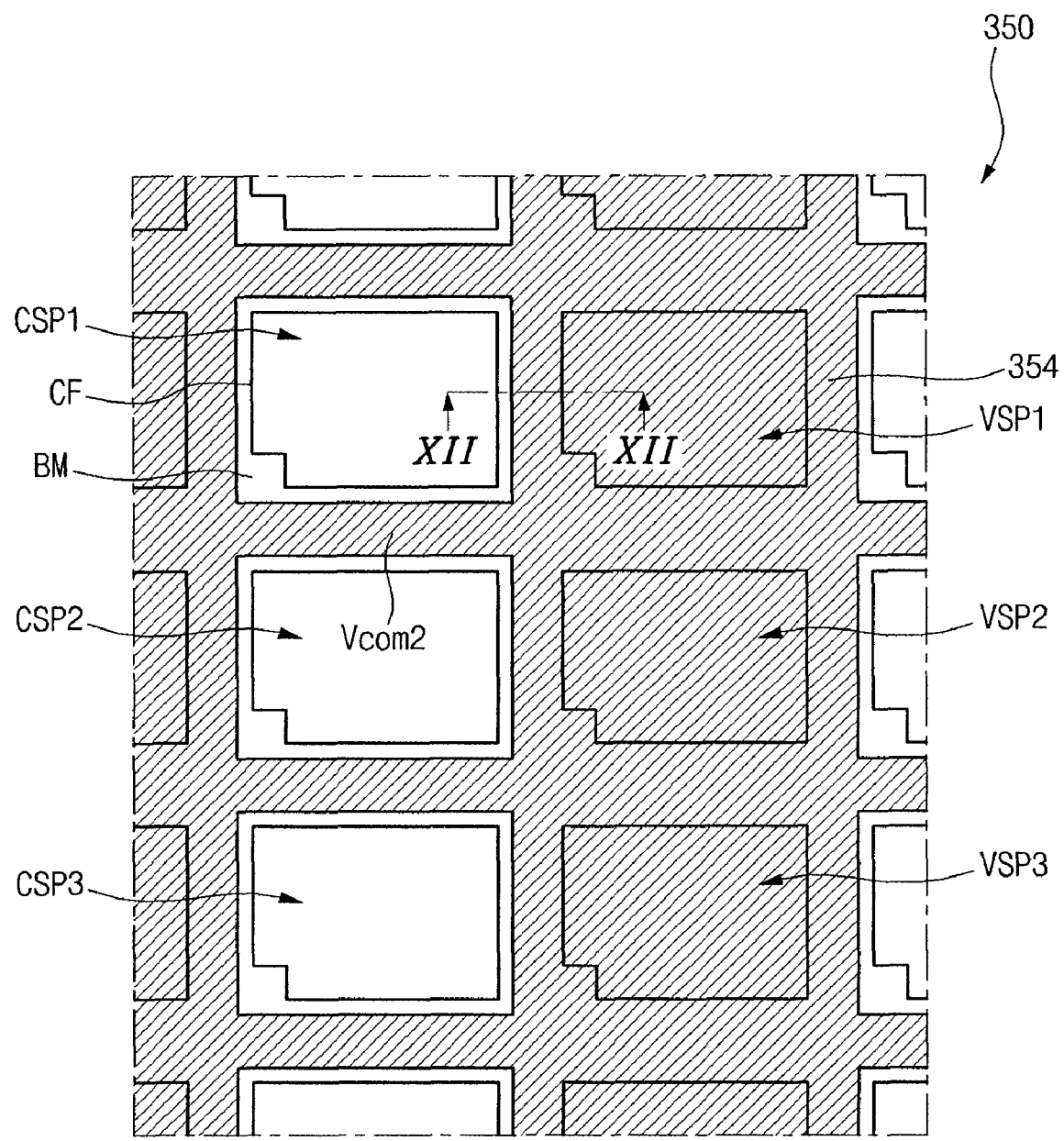
Figure 12:
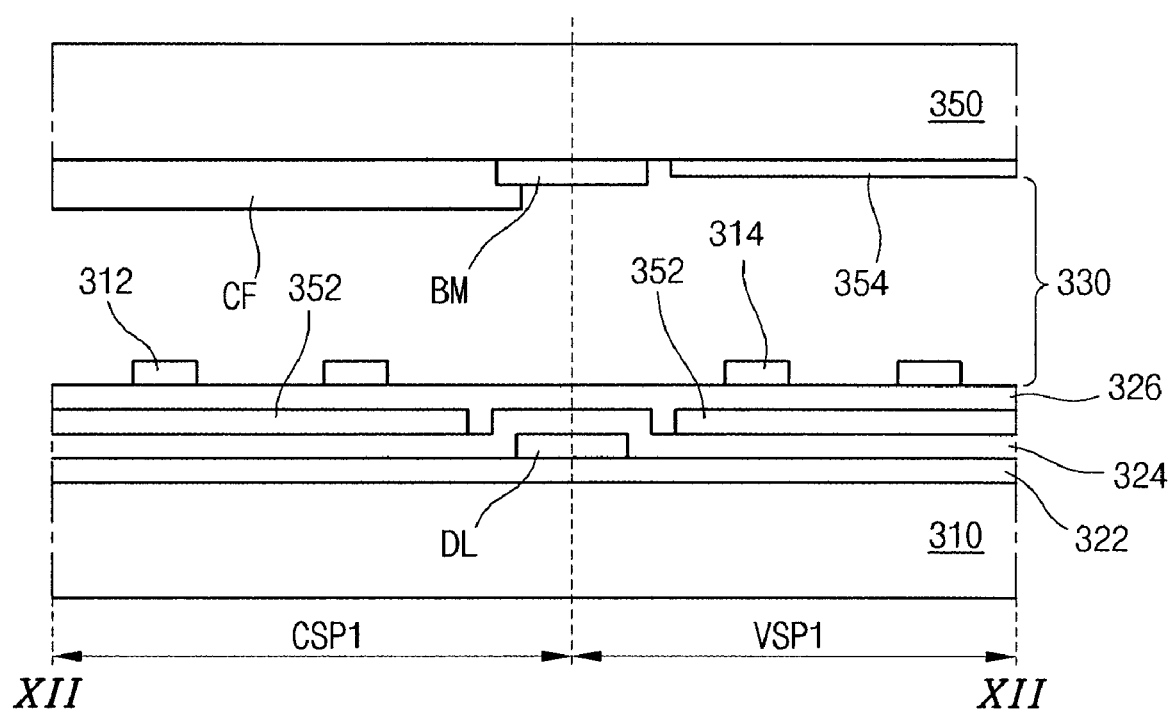
FIG. 12 is a cross-sectional view taken along line XII-XII of FIGS. 11A and 11B.

FIGS. 11A and 11B are plane views showing an array substrate and a color filter substrate for a viewing angle restricting LCD device according to a sixth exemplary embodiment of the invention, respectively, and FIG. 12 is a cross-sectional view taken along the line XII-XII of FIGS. 11A and 11B. As shown in FIGS. 11A, 11B and 12, the viewing angle restricting LCD device includes first and second substrates 310 and 350 facing each other, and a layer of liquid crystal molecules 330 interposed therebetween. The unit pixel, which includes the first to third color displaying sub-pixels CSP1, CSP2 and CSP3 and the first to third viewing angle restricting sub-pixels VSP1, VSP2 and VSP3, is defined on the first and second substrates 310 and 350. The first to third color displaying sub-pixels CSP1, CSP2 and CSP3 correspond one-to-one with the first to third viewing angle restricting sub-pixels VSP1, VSP2 and VSP3. The first to third color displaying sub-pixels CSP1, CSP2 and CSP3 are sequentially arranged in a first column of the unit pixel, and the first to third viewing angle restricting sub-pixels VSP1, VSP2 and VSP3 are sequentially arranged in a second column of the unit pixel.

The first substrate 310 includes gate lines GL, data lines DL, and TFTs T. The gate and data lines GL and DL cross each other to define each sub-pixel CSP1, CSP2, CSP3, VSP1, VSP2 and VSP3. The TFTs T are respectively formed in each of the sub-pixel CSP1, CSP2, CSP3, VSP1, VSP2 and VSP3 and connected to the gate and data lines GL and DL. First insulating layers 322 may be formed between the gate lines GL and the data lines DL. Second insulating layers 324 and third gate insulating layers 326 can be sequentially formed on the data lines DL. The second substrate 350 includes the black matrix BM corresponding to the gate and data lines GL and DL, and the TFTs T.

The first common electrodes 352 have a plate shape and are respectively formed on the first substrate 310 over the first to third color displaying sub-pixels CSP1, CSP2 and CSP3. The first common electrodes 352 can be formed between the second and third gate insulating layers 324 and 326. The first pixel electrodes 312, which have a bent bar shape and are connected to the TFTs T, are formed on the third gate insulating layers 326 in the first to third color displaying sub-pixels CSP1, CSP2 and CSP3. The first pixel electrodes 312 having the bent bar shape can have angles of either 45 degrees or 315 degrees with respect to the gate lines GL. The color filter layer CF is formed on the second substrate 350 in the first to third color displaying sub-pixels CSP1, CSP2 and CSP3. The color filter CF includes red, green and blue colors.

The first pixel electrodes 312 having the bent bar shape are shown in FIG. 11A. In the alternative, the first pixel electrode 312 can have a linear bar shape. Moreover, the data lines DL can have the same bent bar shape as the first pixel electrodes 312. The first to third color displaying sub-pixels CSP1, CSP2 and CSP3 have a mono-domain in the case of the linear bar shape. The first to third color displaying sub-pixels CSP1, CSP2 and CSP3 have multiple domains in the case of the bent bar shape that results in a wide viewing angle.

When voltages are applied across the first pixel electrodes 312 and the first common electrodes 352, some liquid crystal molecules 330 are driven by fringe electric fields induced between the first pixel electrodes 312 and the first common electrodes 352 such that the viewing angle is widened. The fringe electric fields have the reverse U-shape. Other liquid crystal molecules 330 are driven by horizontal electric fields, which corresponds to a flat top surface of the fringe electric fields.

First common electrodes 352 are formed on the first substrate 310 in the first to third viewing angle restricting sub-pixels VSP1, VSP2 and VSP3. The first common electrodes 352 have a plate shape and respectively cover the surfaces of the first to third viewing angle restricting sub-pixels VSP1, VSP2 and VSP3. The first common electrodes 352 may be formed on the second gate insulating layer 324s on the first substrate 310. Second pixel electrodes 314 are formed over the first common electrodes 352. The second pixel electrodes 314 are connected to the TFTs T in the first to third viewing angle restricting sub-pixels VSP1, VSP2 and VSP3 and have the bent bar shape. Third gate insulating layers 326 can be interposed between the first common electrodes 352 and the second pixel electrodes 314. The second common electrodes 354 are formed on the second substrate 350 in the first to third viewing angle restricting sub-pixels VSP1, VSP2 and VSP3. The second common electrode 354 can have the plate shape such that the second common electrodes 354 cover surfaces of the first to third viewing angle restricting sub-pixels VSP1, VSP2 and VSP3. The second pixel electrode 314 having the bent bar shape can have an angle of either 45 degrees or 315 degrees with respect to the gate lines GL.

Similar to the first pixel electrodes 312, the second pixel electrodes 314 can have a linear bar shape. Moreover, the data lines DL may have the same bent bar shape as the second pixel electrodes 314. The sub-pixels each have a mono-domain in the case of the linear bar shape. On the other hand, the sub-pixels have multiple domains in case of the bent bar shape such that the viewing angle is widened.

The first to third viewing angle restricting sub-pixels VSP1, VSP2 and VSP3 are driven by using different electrodes depending on their modes. In the wide viewing angle mode, the second pixel electrodes 314 and the first common electrodes 352 are used to drive the layers of liquid crystal molecules 330 in the first to third viewing angle restricting sub-pixels VSP1, VSP2 and VSP3. However, in the narrow viewing angle mode, the first common electrodes 352 and the second common electrodes 354 are used to drive the layers of liquid crystal molecules 330 in the first to third viewing angle restricting sub-pixels VSP1, VSP2 and VSP3.

When voltages are applied across the second pixel electrodes 314 and the first common electrodes 352 in the wide viewing angle mode, the layers of liquid crystal molecules 330 are driven by the fringe electric field induced between the second pixel electrodes 314 and the first common electrodes 352. In this case, a same voltage as the first common electrode 352 is applied into the second common electrode 354 such that an electric field is not induced between the first and second common electrodes 352 and 354. In other words, in the wide viewing angle mode, the layers of liquid crystal molecules 330 are driven by the fringe electric field between the second pixel electrodes 314 and the first common electrodes 352 such that images are displayed to all viewing angles. The luminances of the white colors from the first to third viewing angle restricting sub-pixels VSP1, VSP2 and VSP3 correspond to the luminance of the images from the first to third color displaying sub-pixels CSP1, CSP2 and CSP3 such that luminances of the first to third viewing angle restricting sub-pixels VSP1, VSP2 and VSP3 compensate the images from the first to third color displaying sub-pixels CSP1, CSP2 and CSP3. Accordingly, the luminance property in the wide viewing angle mode is improved. When the first to third viewing angle restricting sub-pixels VSP1, VSP2 and VSP3 do not include the second pixel electrode 324 and the same voltage is applied into the first and second common electrodes 352 and 354, the first to third viewing angle restricting sub-pixels VSP1, VSP2 and VSP3 display the black color. As a result, the luminance and the aperture ratio deteriorate. However, since the first to third viewing angle restricting sub-pixels VSP1, VSP2 and VSP3 include the second pixel electrode 314, the LCD device does not have the above-mentioned problems.

In the narrow viewing angle mode, voltages are applied across the first and second common electrodes 352 and 354 such that the liquid crystal layer 330 is driven by the vertical electric field induced between the first and second common electrodes 352 and 354. In this case, the same voltage as the first common electrode 352 is applied into the second pixel electrode 314 such that an electric field is not induced between the second pixel electrode 314 and the first common electrode 352. The first to third viewing angle restricting sub-pixels VSP1, VSP2 and VSP3 display the white color at side viewing angles. Accordingly, the images form the first to third color displaying sub-pixels CSP1, CSP2 and CSP3 is damaged by the white color such that the viewing angle is restricted. The first to third viewing angle restricting sub-pixels VSP1, VSP2 and VSP3 has a transmittance of 0% in the front viewing angle. As it goes left and right sides from the front viewing angle, the transmittance increases to a certain viewing angle. As it goes left and right sides from the certain side viewing angle, the transmittance decreases. Accordingly, the first to third viewing angle restricting sub-pixels VSP1, VSP2 and VSP3 have a maximum transmittance at the certain side viewing angle. The maximum transmittance may be about 100%.

To obtain the above-mentioned transmittance properties, the liquid crystal molecules can be aligned to have an angle of either 90 degrees or 270 degrees with respect to the gate lines GL. The first and second polarizers (not shown) having first and second optical axes, respectively, are disposed on outer surfaces of the first and second substrates 310 and 350. The first and second optical axes can be 0 degree or 90 degrees with respect to the gate lines, respectively. Accordingly, the first and second optical axes are perpendicular to each other. When the first and second optical axes are perpendicular to each other and the liquid crystal molecules 330, which have an initial alignment of either 90 degrees or 270 degrees, is driven by the fringe electric field between the first pixel electrodes 312 and the first common electrodes 352, the first to third color displaying sub-pixels CSP1, CSP2 and CSP3 have a wide viewing angle.

The luminance of the first to third viewing angle restricting sub-pixels VSP1, VSP2 and VSP3 enhance or corrupt the images from the first to third color displaying sub-pixels CSP1, CSP2 and CSP3 at the side viewing angles depending on the mode. In more detail, when voltages, which correspond to the voltages applied into the first to third color displaying sub-pixels CSP1, CSP2 and CSP3, are applied across the second pixel electrodes 314 and the first common electrodes 352, the viewing angle restricting LCD device is in the wide viewing angle mode. On the other hand, when voltages are applied into the first and second common electrodes 352 and 354, the viewing angle restricting LCD device is in a narrow viewing angle mode. As a result, the viewing angle restricting LCD device according to the sixth exemplary embodiment of the invention has convertibility between the wide and narrow viewing angle modes. The driving method described with FIGS. 7A to 7D may be applied into the viewing angle restricting LCD device according to the sixth exemplary embodiment of the invention.

It will be apparent to those skilled in the art that various modifications and variations can be made in the substrate for the liquid crystal display device and the method of fabricating the same of the invention without departing from the spirit or scope of the invention. Thus, it is intended that the present invention covers the modifications and variations of this invention provided they come within the scope of the appended claims and their equivalents.

What is claimed is:

1. A method of driving a liquid crystal display device including first, second, and third color displaying sub-pixels and first, second, and third viewing angle restricting sub-pixels, the first, second, and third color displaying sub-pixels corresponding one-to-one with the first, second, and third viewing angle restricting sub-pixels, the first, second, and third color displaying sub-pixels including first and second electrodes, and the first, second, and third viewing angle restricting sub-pixels include third and fourth electrodes, the method comprising:
    in a first viewing mode, applying first voltages to the first and second electrodes, respectively, in each of the first, second, and third color displaying sub-pixels and the same first voltages to the third and fourth electrodes, respectively, in each of the first, second, and third viewing angle restricting sub-pixels; and
    in a second viewing mode, applying second voltages to the first and second electrodes, respectively, in each of the first, second, and third color displaying sub-pixels and different third voltages to the third and fourth electrodes, respectively, in each of the first, second and third viewing angle restricting sub-pixels.

2. The method according to claim 1, wherein the first, second and third electrodes are formed on the first substrate and the fourth electrode is formed on the second substrate.

3. The method according to claim 1, wherein the first and third electrodes are formed on the first substrate and the second and fourth electrodes are formed on the second substrate.

4. The method according to claim 1, wherein the viewing angle restricting images have a minimum luminance at a front viewing angle and a maximum luminance at a side viewing angle different from the front viewing angle.

5. The method according to claim 1, wherein the first voltages are the same as the second voltages.

6. The method according to claim 1, wherein the first voltages are different from the second voltages.

7. A method of driving a liquid crystal display device including first, second, and third color displaying sub-pixels and first, second, and third viewing angle restricting sub-pixels, the first, second, and third color displaying sub-pixels corresponding to one-to-one with the first, second, and third viewing angle restricting sub-pixels, the first, second, and third color displaying sub-pixels including first and second electrodes, and the first, second, and third viewing angle restricting sub-pixels include third, fourth and, fifth electrodes, comprising:
    in a first viewing mode, applying first voltages to the first and second electrodes, respectively, in each of the first, second, and third color displaying sub-pixels and the same first voltages to the third and fourth electrodes, respectively, in each of the first, second, and third viewing angle restricting sub-pixels, the voltage applied to the third electrode and the voltage applied to the fourth electrode corresponding to the voltage applied to the first electrode and the voltage applied to the second electrode, respectively; and
    in a second viewing mode, applying second voltages to the first and second electrodes, respectively, in each of the first, second, and third color displaying sub-pixels and different third voltages to the third and fifth electrodes, respectively, in each of the first, second, and third viewing angle restricting sub-pixels.

8. The method according to claim 7, wherein the viewing angle restricting images have a minimum luminance at a front viewing angle and a maximum luminance at a side viewing angle different from the front viewing angle.

9. The method according to claim 7, wherein the first voltages are the same as the second voltages.

10. The method according to claim 7, wherein the first voltages are different from the second voltages.

* * * * *